(12) United States Patent
Tran

(10) Patent No.: US 7,949,439 B2
(45) Date of Patent: May 24, 2011

(54) METHOD AND A SYSTEM FOR DIAGNOSING AN AIRCRAFT FROM MEASUREMENTS PERFORMED ON THE AIRCRAFT

(75) Inventor: Bang Tran, Aix En Provence (FR)

(73) Assignee: Eurocopter (FR)

( * ) Notice: Subject to any disclaimer, the term of this patent is extended or adjusted under 35 U.S.C. 154(b) by 964 days.

(21) Appl. No.: 11/832,764

(22) Filed: Aug. 2, 2007

(65) Prior Publication Data

US 2008/0065281 A1    Mar. 13, 2008

(30) Foreign Application Priority Data

Sep. 11, 2006  (FR) ...................... 06 07926

(51) Int. Cl.
  *G06F 19/00*  (2006.01)
  *G06F 15/18*  (2006.01)
(52) U.S. Cl. ................ 701/3; 701/29; 701/120; 702/35; 706/16
(58) Field of Classification Search ................ 701/3, 29, 701/120; 702/35, 182; 706/16, 52; 244/1 N; 455/450
See application file for complete search history.

(56) References Cited

U.S. PATENT DOCUMENTS

| 6,282,459 | B1 | 8/2001 | Ballantine et al. |
| 6,301,572 | B1 | 10/2001 | Harrison |
| 6,507,790 | B1 | 1/2003 | Radomski |
| 2005/0096873 | A1 | 5/2005 | Klein |
| 2007/0087756 | A1* | 4/2007 | Hoffberg ...................... 455/450 |

FOREIGN PATENT DOCUMENTS

JP           61-38426 A         2/1986

OTHER PUBLICATIONS

Tran et al., "A Rapid Helicopter Drive Train Fault Detection Using Neuro-Fuzzy Method," http://erf32.nlr.nl/abstracts/pdf/HU02.pdf, 32$^{nd}$ European Rotorcraft Forum (Sep. 12, 2006).

* cited by examiner

*Primary Examiner* — Tan Q Nguyen
(74) *Attorney, Agent, or Firm* — Brooks Kushman P.C.

(57) ABSTRACT

A method of diagnosing an aircraft by analyzing at least one spectrum obtained from measurements taken on the aircraft, in particular from vibration measurements, in which the spectrum (spectra) to be analyzed is/are input to a calculation module (23) together with at least one first reference spectrum, the calculation module determining a diagnosis value (Diag) as a function of the spectrum (spectra) to be analyzed, of the reference spectrum (spectra), and of parameters determined from at least two reference spectra including the first reference spectrum.

14 Claims, 6 Drawing Sheets

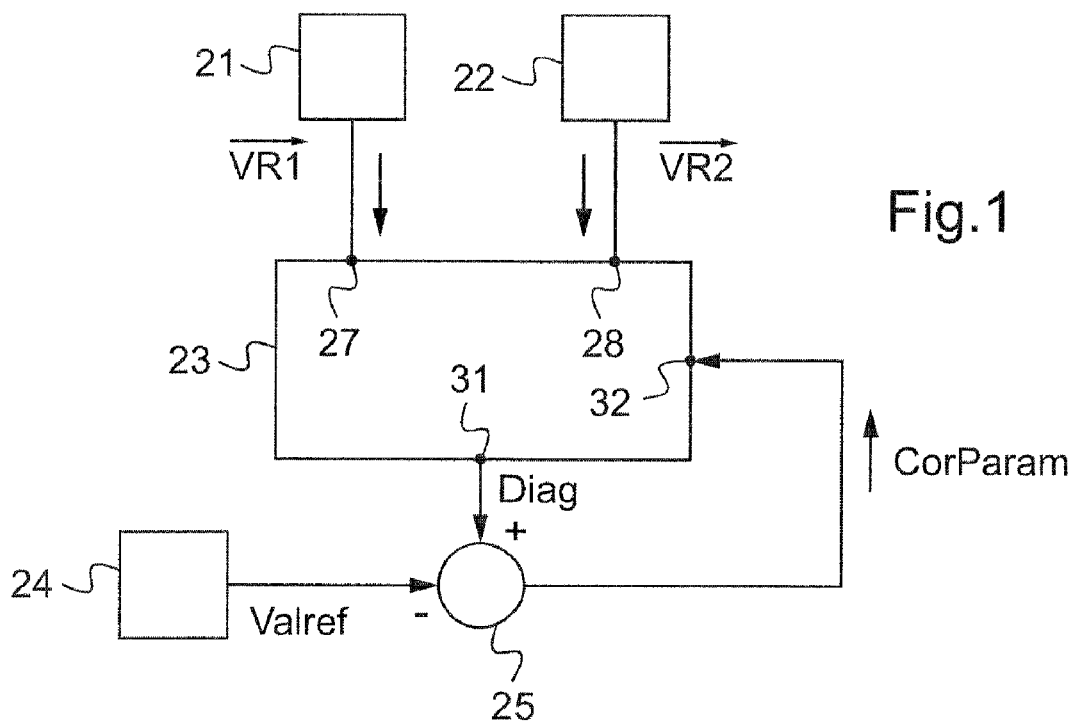
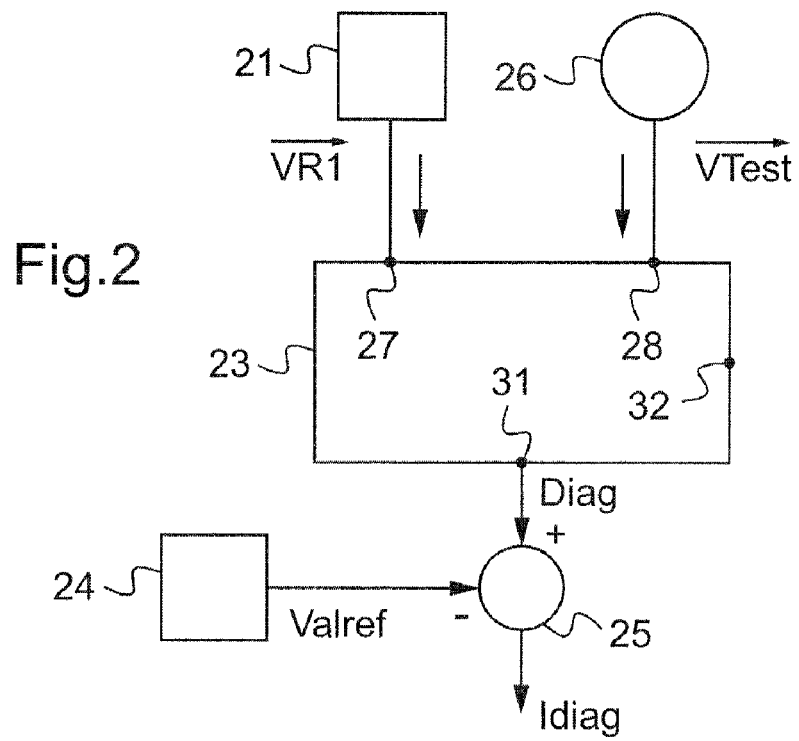

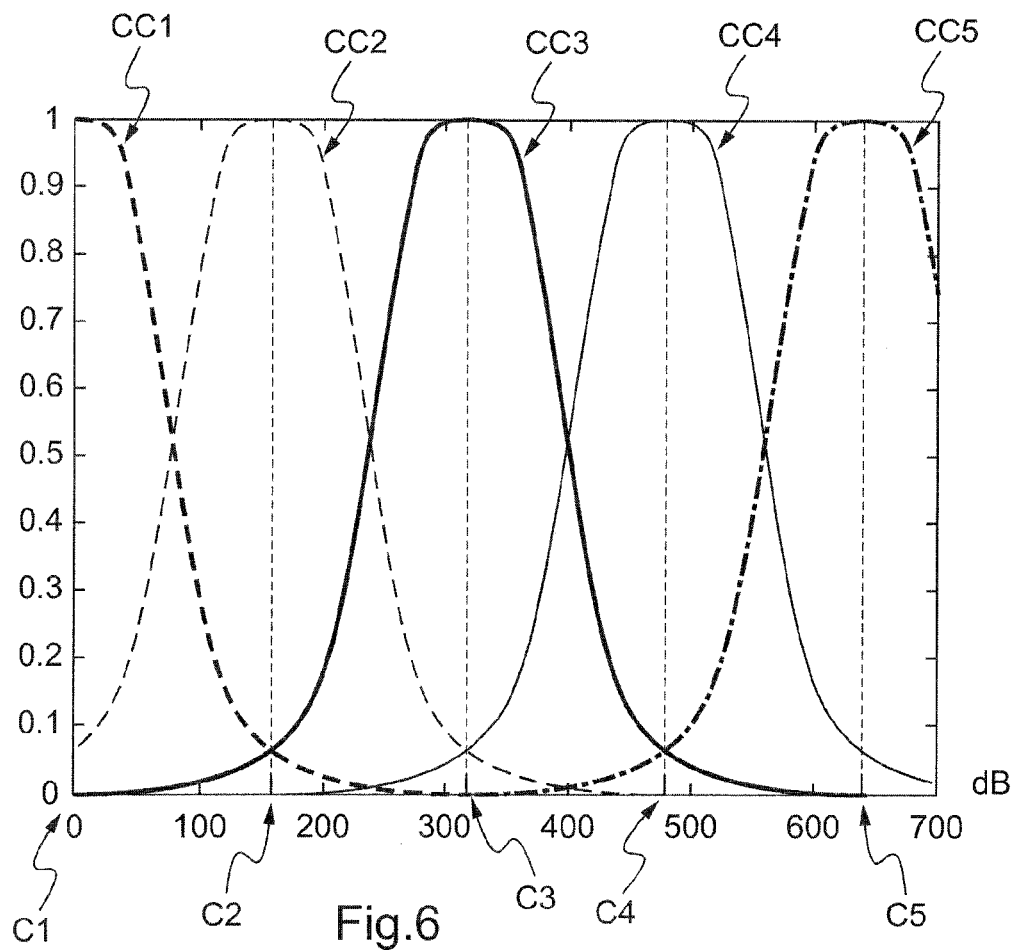
Fig.6
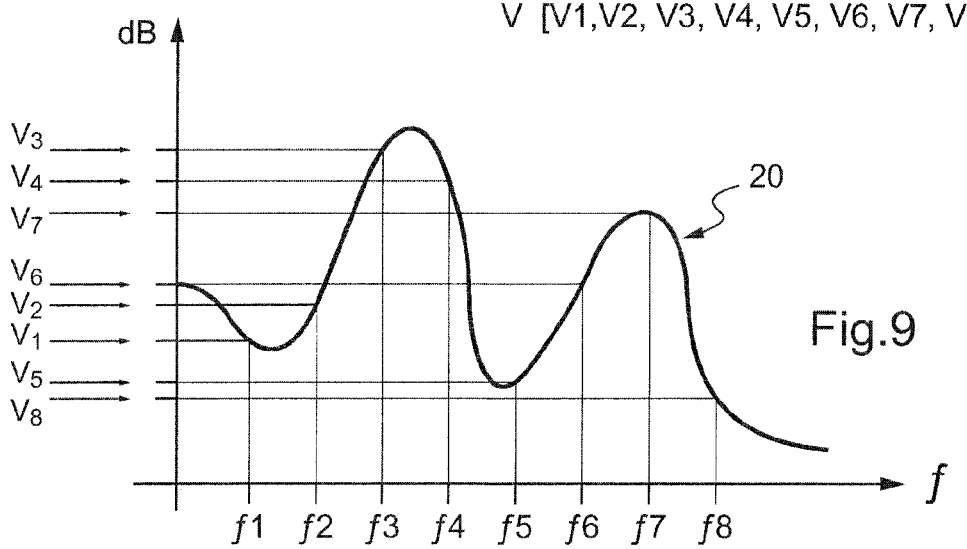
Fig.10
Fig.9

METHOD AND A SYSTEM FOR DIAGNOSING AN AIRCRAFT FROM MEASUREMENTS PERFORMED ON THE AIRCRAFT

The present invention relates to a method and to a system for diagnosing at least a portion of an aircraft on the basis of measurements performed on the aircraft, i.e. for detecting the existence of at least one fault.

FIELD OF THE INVENTION

The technical field of the invention is that of manufacturing helicopters.

The present invention relates in particular to a method and to a system for automatically detecting the existence of mechanical malfunction on board a rotorcraft, on the basis of vibration measurements performed on the rotorcraft in flight.

The invention applies in particular to diagnosing a transmission mechanism inserted between at least one engine and at least one rotor of the rotorcraft. Such a mechanism usually includes a plurality of shafts carrying gears and enabling torque to be transmitted from the engine(s) to the rotor(s) and the accessories of the rotorcraft.

BACKGROUND OF THE INVENTION

Monitoring or detecting the appearance of a fault within a mechanism has been the subject of a large amount of research; mention can be made of U.S. Pat. No. 6,301,572 relating to monitoring the state of engines or turbines.

The present invention applies in particular to diagnosing a mechanism by analyzing the vibrations produced, at least in part, by the operation of the mechanism.

To make the measurement, the helicopter is fitted with accelerometers that are placed on (secured to) the engine(s), the casing(s) of the transmission gearbox(es), the bearings of the shafts, and/or other points of the structure of the helicopter.

In flight, the signals delivered by the sensors can be converted into data and, where appropriate, synchronized (by signals delivered by a rotation sensor) and/or "averaged", and then recorded on board the helicopter.

On return to the ground, the recorded data can be collated and analyzed. Interpreting this data is complex: it requires lengthy intervention by an expert.

The document "A rapid helicopter drive train fault detection using neuro-fuzzy method" (http://erf32.nlr.nl/abstracts/pdf/HU02.pdf) by Bang Tran et al. proposes applying a neuro-fuzzy logic method to the detection of breakdowns of mechanical systems on the basis of vibration signals.

Known tools for automatically analyzing such data in order to diagnose a mechanical fault in a mechanism are incomplete and imperfect; existing faults are sometimes not detected by such analysis tools, and fault warnings are sometimes wrongly generated thereby.

OBJECTS AND SUMMARY OF THE INVENTION

An object of the invention is to provide a method of analyzing such data, an analysis program, and apparatus including the program, serving to establish quickly a diagnosis that is reliable, i.e. maximizing the percentage of real faults that are detected while minimizing the percentage of unconfirmed faults.

An object of the invention is to propose such methods, programs, and apparatuses or systems that are improved and/or that remedy at least in part the shortcomings or drawbacks of prior art methods, programs, and systems.

In one aspect, the invention provides a method of diagnosing an aircraft by analyzing at least one spectrum obtained from measurements taken on the aircraft, in particular from vibration measurements, in which the spectrum (spectra) to be analyzed is/are input to a calculation module together with at least one first reference spectrum, the calculation module serving to determine a (single) diagnosis value as a function of the spectrum (spectra) to be analyzed, of the reference spectrum (spectra), and of parameters determined from at least two reference spectra including said first reference spectrum.

In another aspect, the invention provides a method of diagnosing an aircraft by analyzing at least one spectrum obtained from measurements, on particular from vibration measurements made on the aircraft, in which:

in a preparatory stage, at least two reference spectra are input to a parameterized calculation module that outputs a diagnosis value; the parameters of the calculation module are modified to obtain a reference value at the output; and then in a diagnosis stage, one or more spectra to be analyzed together with some of the reference spectra are input to the parameterized calculation module that outputs the diagnosis value; and a fault is diagnosed when the diagnosis value exceeds the reference value.

In other words, parameters are initially determined that are common to the reference spectra; thereafter, some of the reference spectra are replaced by one or more spectra to be analyzed, while retaining at least one reference spectrum; and then a diagnosis value is determined for the analyzed spectrum (spectra), as a function of the retained reference spectra and of the common parameters.

To do this, a calculation module is used that comprises a plurality of operators organized in layers and/or in a network, including parametric membership operators and parametric weighting operators applied to the spectra that are input.

In one implementation, such a method is proposed in which, during the diagnosis stage, at least one spectrum data (or frequency data) vector to be analyzed together with at least one reference spectrum data vector are input to the calculation module which, for each input vector, determines a plurality of degree-of-membership vectors for the components of the input vector, specifying their respective degrees of membership to a plurality of classes, and which calculates a (single) diagnosis value as a function of the degree-of-membership vectors, and in which a fault of the aircraft is indicated when the diagnosis value exceeds a threshold, or reference value.

Each of the spectrum data vectors can be the result of a Fourier transform applied to measurement data resulting from sampling signals delivered by microphones or accelerometers at a frequency that may be at least about 1 kilohertz (kHz) (and in particular a frequency of about 5 kHz, 10 kHz, 50 kHz, or 250 kHz), each of the frequency data vectors possibly comprising several thousands of coordinates/components/values.

At least some of the operations in the preparatory stage and/or the diagnosis stage of methods of the invention can be implemented by an electronic data processor unit, such as a computer, operating under the control of a program.

Thus, in another aspect, the invention provides a program comprising code applied to a medium, such as a memory, or implemented by a signal, the code being readable and/or executable by at least one data processor unit, such as a processor on board or suitable for mounting on board an aircraft, in order to diagnose the (good or bad) operation of an aircraft, the code including code segments for respectively performing the various operations of a method in accordance with the invention.

In another aspect of the invention, an aircraft diagnosis system is proposed that comprises:
- a member for reading a data medium and arranged to read data relating to measurements made on the aircraft;
- a database containing reference spectrum data for the aircraft;
- apparatus for transforming the measurement data from the time domain to the frequency domain, which apparatus is connected to the read member to receive the measurement data and to output spectrum data to be analyzed; and
- a calculation member connected to the database and to the transformation apparatus, and programmed to perform the operations of a method in accordance with the invention.

A few hours of flying time can suffice to constitute a database that is characteristic of a determined type of aircraft; this database containing a small quantity of data can easily be recorded in a memory associated with a computer for subsequent use in estimating, after each flight, the good or bad operating state of all or some of the mechanisms of an aircraft.

BRIEF DESCRIPTION OF THE DRAWINGS

Other aspects, characteristics, and advantages of the invention appear from the following description which refers to the accompanying drawings and which describes preferred embodiments of the invention without any limiting character.

FIG. 1 is a diagram of a diagnosis system in a first embodiment of the invention and shows it being implemented in a preparatory (training) stage in order to determine the parameters of the parameterized calculation module it includes.

FIG. 2 is a diagram showing the use of the FIG. 1 diagnosis system for diagnosing the state of an aircraft from a new spectrum.

FIG. 6 is a diagram plotting five membership curves which are characteristic respectively of five membership modules/operators forming part of a calculation module such as that shown in FIGS. 7 and 8.

FIG. 9 is a graph showing diagrammatically an example of a spectrum obtained from vibration measurements, and FIG. 10 in association with FIG. 9 shows the coordinates of this vector.

MORE DETAILED DESCRIPTION

Figure 3:
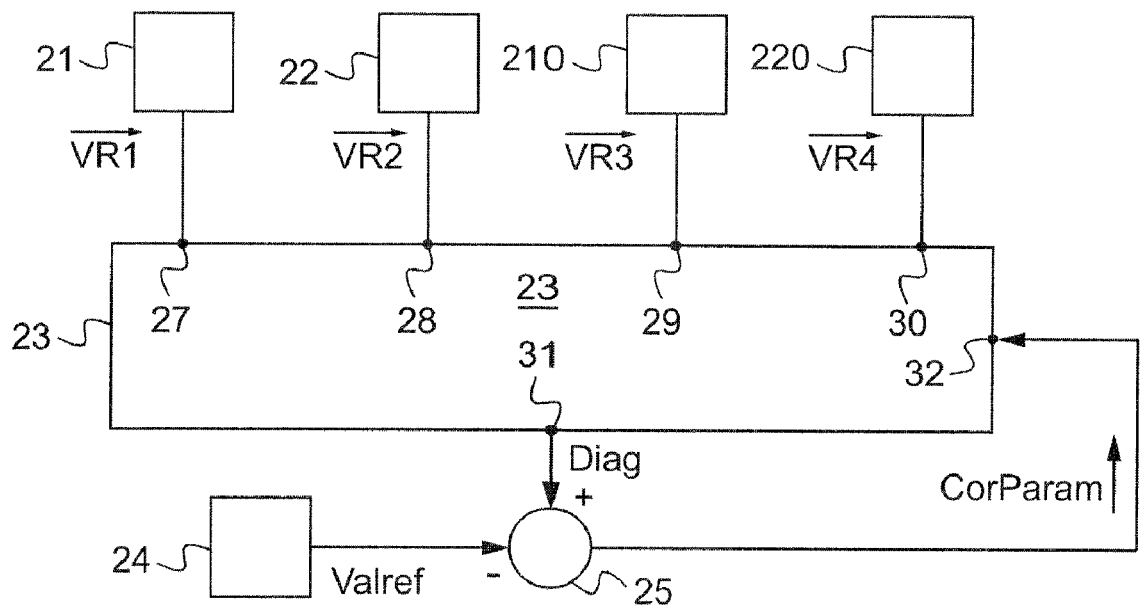
FIG. 3 is a diagram of a diagnosis system in a second embodiment of the invention showing its implementation in the preparatory (training) stage for determining the parameters of the parameterized calculation module it includes.

In an aspect of the invention, it is determined whether (at least one) spectrum coming from measurements on the aircraft is, or is not, representative of good overall operation of the aircraft or of good operation of a particular mechanism of the aircraft, by "comparing" the "appearance" or the "shape" of the spectrum with the appearance or shape common to (at least) two other, so-called "reference" spectra.

More particularly, the appearance of the spectrum under analysis is "compared" with only some of the reference spectra, using parameters previously determined from all of the reference spectra.

To some extent, it can be considered that these parameters are characteristic of the appearance that is common to all of the reference spectra. As can be seen from the description below, the number of these parameters is small, so the number of operations required to perform the "comparison" between the spectra is likewise small, and these operations are simple.

The methods, programs, and systems of the invention thus enable diagnosis to be performed quickly; it has also been found that the results obtained are astonishingly reliable.

In practice, a determined aircraft is generally fitted with permanent sensors, and in particular accelerometers.

During each flight, the signals delivered by each accelerometer are digitized and the corresponding measurement data is recorded. After a flight, and on the basis of the recorded data, the method and the system of the invention serve to determine whether the operating state of at least a portion of the aircraft is satisfactory, in comparison with previously-recorded measurements representative of the same aircraft while it was known to be in a satisfactory state of operation.

In order to enable the results of this comparison to be used validly for diagnosis purposes, it is important not only for the aircraft in question to be the same, but also for the sensors that gave rise to the measurements whose spectra are under analysis to be the same as the sensors that were used for generating the reference spectra.

In practice, it is therefore important to build up a database of spectra representative of the proper operation of various portions of the aircraft progressively as the aircraft is used, and thereafter to use the spectra as reference spectra.

Unless stated explicitly or implicitly to the contrary, in the present application, the terms "spectrum data" and "frequency data" are used interchangeably to designate the values of components of a spectrum obtained from measurements, e.g. by a Fourier transform.

Unless stated explicitly or implicitly to the contrary, in the present application, the terms "spectrum data vector(s)" and "spectrum or spectra" are used interchangeably to designate a finite sequence of spectrum data applied as input to calculation modules of systems of the invention.

By way of example, FIG. 9 shows a curve 20 representative of a spectrum obtained from measurements; in this graph, the abscissa axis represents frequency (f), and the ordinate axis represents a level of acceleration that can be expressed in decibels (dB), in meters per second per second ($m/s^2$) or in "g" ($g \approx 9.81$ $m/s^2$).

This curve can be considered as a sequence of respective abscissa points f1 to f8 and respective ordinates v1 to v8.

FIG. 10 shows a vector $\vec{V}$ of spectrum data [v1, v2, v3, v4, v5, v6, v7, v8] corresponding to the eight points in question of the curve 20 in FIG. 9.

In practice, vectors are used that have a larger number of spectrum values; the number of these values generally depends on the value of the sampling frequency, and for example it may be of the order of 1000 values (or vector components), or of the order of 10,000 values.

With reference to FIGS. 1 and 2, a parameterized calculation module 23 is used that outputs a diagnosis value DIAG; with reference to FIG. 1, this value is the result of applying two reference spectra $\vec{VR1}$ and $\vec{VR2}$ taken from two memories 21 and 22 (i.e. from a database) to two inputs of the module 23.

In a preparatory stage of determining calculation parameters for the module 23, the two spectra $\vec{VR1}$ and $\vec{VR2}$ are presented together at the input of the module, and the module outputs the calculated value DIAG as a function of the initial values of the parameters of the module 23, on the basis of the two vectors $\vec{VR1}$ and $\vec{VR2}$.

An adder 25 compares the value obtained for DIAG with the reference value Valref recorded in a memory 24 and outputs a value CorParam for correcting parameters in the module 23; this correction value is used to modify the values of the parameters of the module; thereafter the value DIAG is calculated again using the same spectra $\vec{VR1}$ and $\vec{VR2}$.

By successive iterations and modifications, the values for the parameters of the module 23 are determined that are such that the value DIAG obtained at the output is equal to the reference value Valref.

The values as obtained in this way for the parameters of the module 23 are then "frozen" (recorded) and the module 23 can subsequently be used for establishing a diagnosis on the basis of a spectrum $\vec{Vtest}$ to be analyzed.

For this purpose, as shown in FIG. 2, the spectrum to be analyzed is recorded in a memory 26 fed with data coming from the sensor that previously delivered the data corresponding to the spectra $\vec{VR1}$ and $\vec{VR2}$.

The reference spectrum $\vec{VR1}$ alone and the spectrum $\vec{Vtest}$ to be analyzed are then applied to the inputs of the module 23 which outputs a diagnosis value DIAG; this value for DIAG is compared with the same reference value Valref as before, by the adder 25 which outputs a flag or indicator Idiag.

In practice, when the value DIAG of the diagnosis exceeds the reference value Valref by more than a threshold value Vthresh, the indicator Idiag can take the value "1" to indicate that the spectrum $\vec{Vtest}$ is representative of malfunction of some part of the aircraft; otherwise, so long as the difference (DIAG−Valref) remains below said threshold value Vthresh, the indicator Idiag takes the value zero to indicate that the spectrum $\vec{Vtest}$ is representative of proper operation of the part in question of the aircraft.

Figure 4:
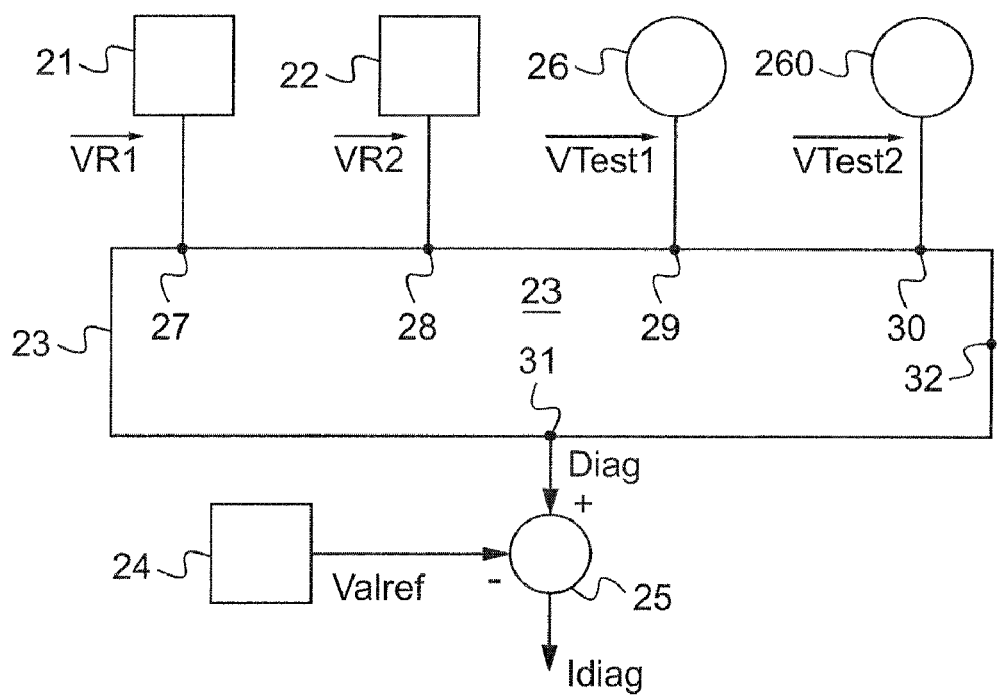
FIG. 4 is a diagram showing the use of the FIG. 3 diagnosis system for diagnosing the state of an aircraft from a new spectrum.

In the embodiment corresponding to FIGS. 3 and 4, four reference vectors $\vec{VR1}$, $\vec{VR2}$, $\vec{VR3}$, and $\vec{VR4}$ are used (FIG. 3) for determining the parameters of the module 23.

In the same manner as described above, these four vectors are read from the memories 21, 22, 210, 220, and are applied to the four inputs of the module 23 which outputs a value DIAG.

The difference CorParam between the value DIAG and the reference value Valref read from the memory 24 is used in iterative manner to modify the parameters of the module 23 until an output value is obtained for DIAG that is equal to the value Valref—e.g. equal to 1.

The parameter values as obtained in this way are recorded and the module 23 can then be used to perform an "overall" diagnosis concerning the state of the components of the aircraft represented by two vectors $\vec{Vtest1}$ and $\vec{Vtest2}$ that are to be analyzed.

These two vectors are read from the memories 26 and 260 are applied (FIG. 4) together with the two reference vectors $\vec{VR1}$ and $\vec{VR2}$ to the inputs of the module 23.

The module 23 outputs a value DIAG which is compared by the comparator/adder 25 to the value Valref; when the value Idiag output thereby is high, it is possible to generate an alarm signal/message and then analyze the vectors $\vec{Vtest1}$ and $\vec{Vtest2}$ separately by comparing them with a single reference vector (cf. FIGS. 1 and 2) or by comparing them with three of the four vectors $\vec{VR1}$ to $\vec{VR4}$ (cf. FIGS. 3 and 4).

When, on the contrary, the value Idiag is less than the threshold value, it is possible to generate a signal/message indicating that the two spectra that have been analyzed are representative of satisfactory behavior of the aircraft in question.

Figure 5:
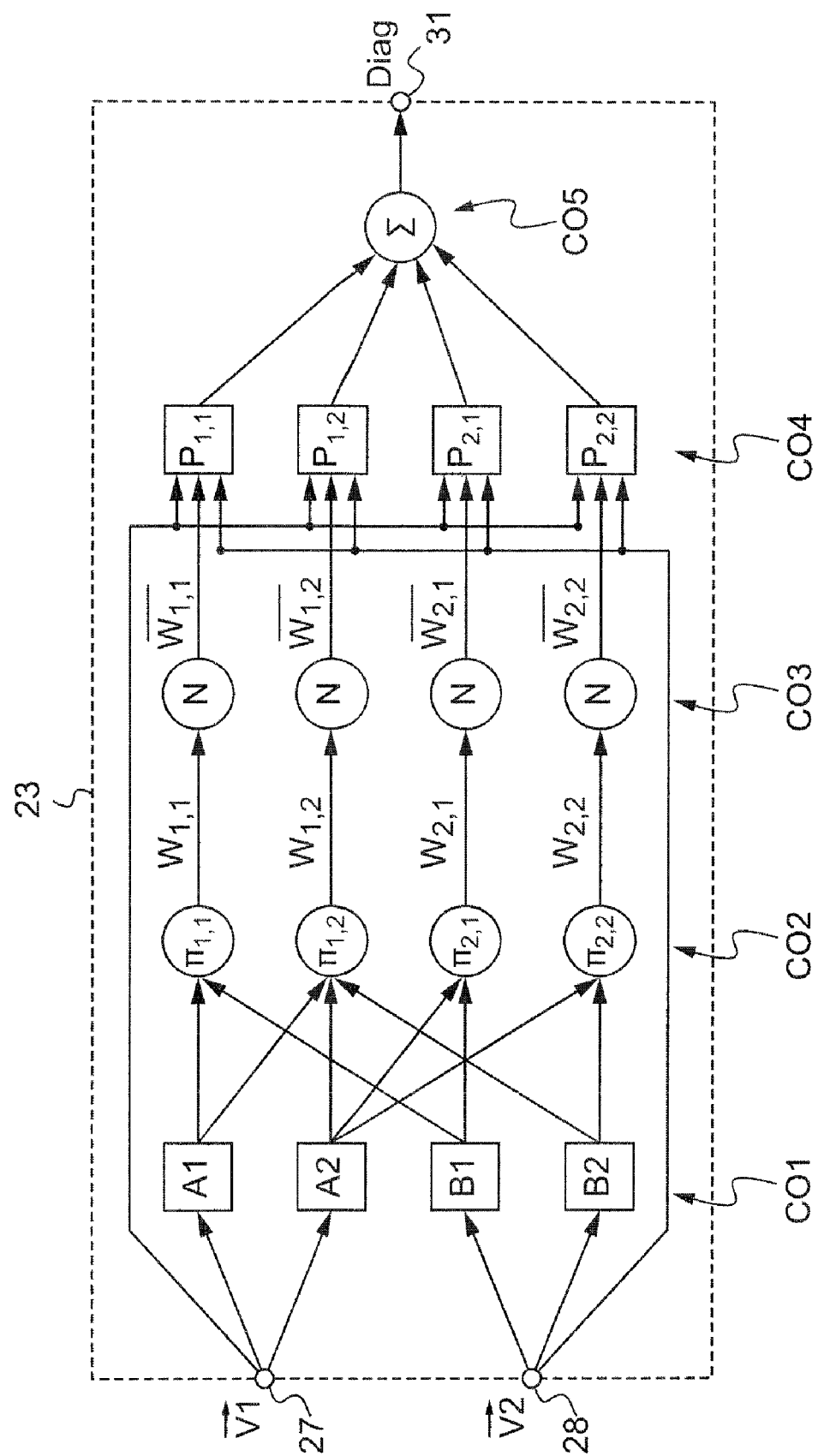
FIG. 5 is a diagram showing the structure of a calculation module of a system of the invention.
Figure 7:
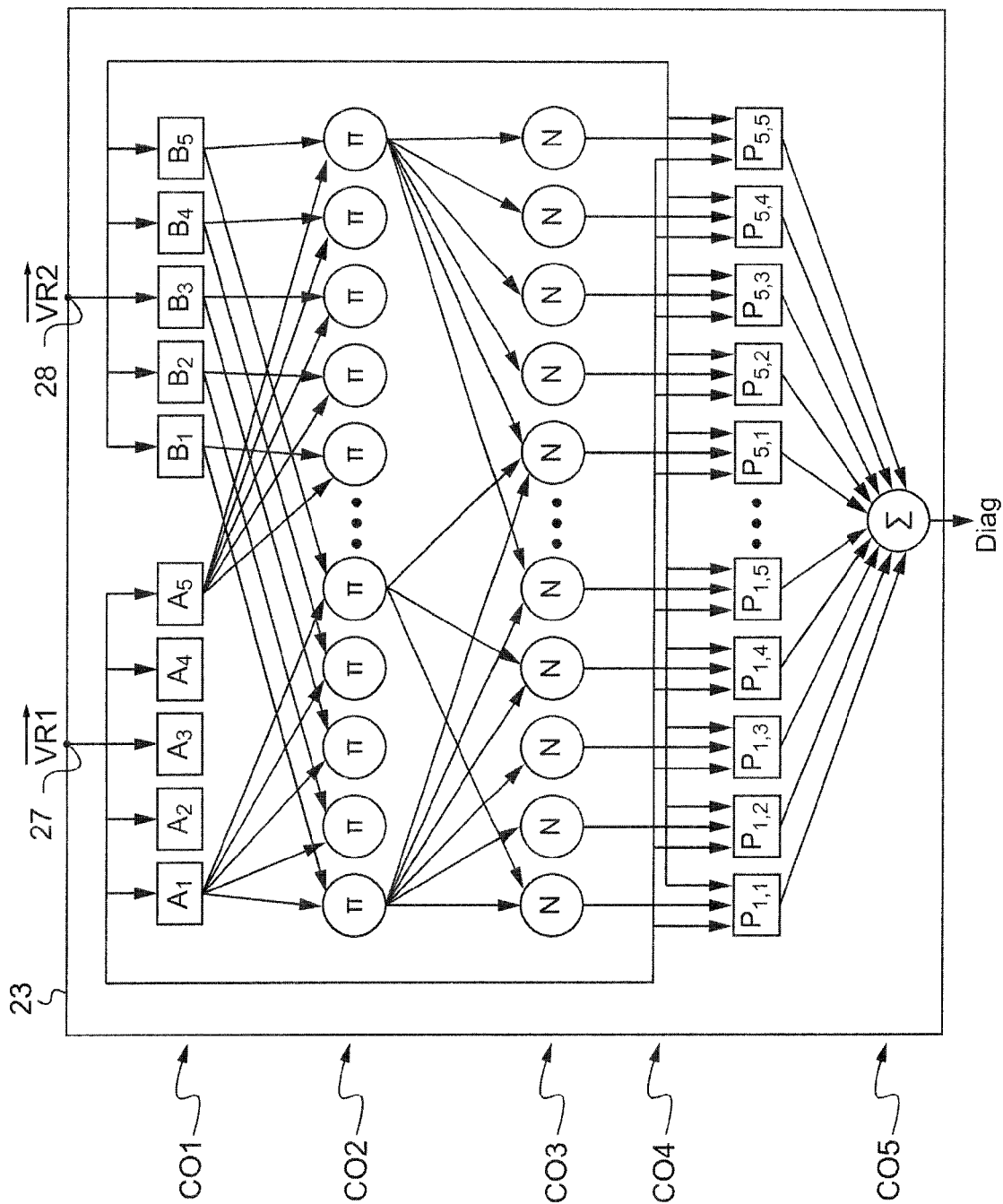
FIG. 7 shows another example of structure for a parameterized calculation module of a system of the invention and its use in the preparatory stage.
Figure 8:
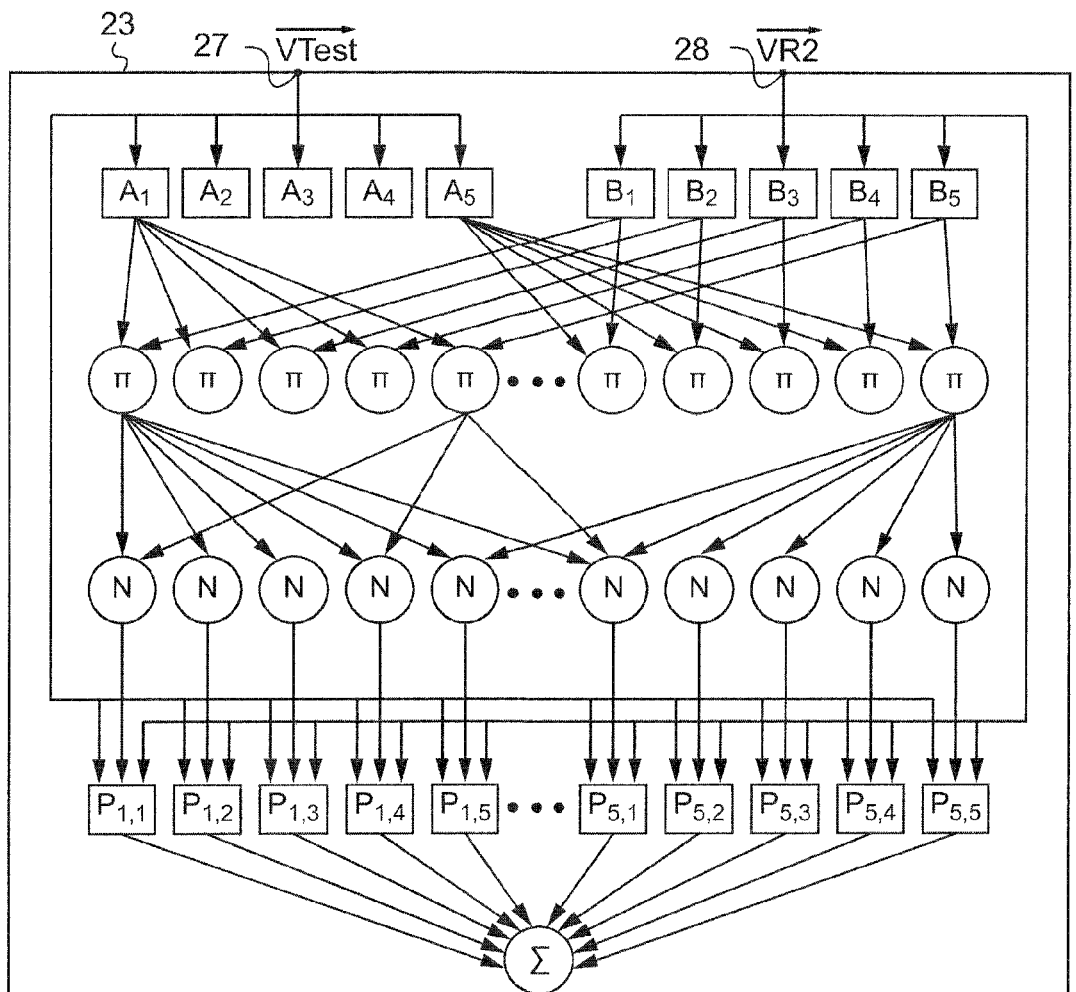
FIG. 8 shows the use of the FIG. 7 calculation module for diagnosing good/bad behavior of an aircraft from a vibration spectrum.

With reference to FIGS. 5, 7, and 8, in particular, it can be seen that the module 23 has operators grouped together in five layers CO1 to CO5 and interconnected to form a network.

The modules shown in these figures have two inputs 27 and 28, and one output 31.

The first layer CO1 is constituted by membership operators $A_1$ to $A_5$ and $B_1$ to $B_5$ each of which is characterized by a membership function.

Each membership operator, such as $A_1$, is connected to one input, such as the input 27, of the module 23 through which one of the vectors, such as $\vec{VR1}$, is input; the operator outputs a vector, referred to as the "degree-of-membership" vector, having the same number of dimensions as the vector applied to the input, in which each component is the result of transforming the component having the same index in the input vector, by using the membership function of the operator in question.

Thus, when the vector $\vec{VR1}$ is applied to the input 27, the operators $A_1$ and $A_2$ of the module 23 supply two degree-of-membership vectors (cf. FIG. 5), and the operators $A_1$-$A_5$ supply five degree-of-membership vectors (cf. FIGS. 7 and 8).

The operation of the operators $B_j$ ($B_1$ to $B_5$) connected to the input 28 is identical to that of the operators $A_i$ ($A_1$-$A_5$).

The second layer CO2 is constituted by multiplication operators $\pi_{i,j}$ each receiving two degree-of-membership vectors delivered by the operators of the layer CO1, and each outputting a value $W_{i,j}$ constituting the product of these pairs of vectors; more precisely, this value is equal to the product of one of the two vectors multiplied by the transpose of the second vector.

The third layer CO3 is constituted by normalization operators N each receiving a product of a pair of membership vectors and outputting a normalized product value. The number of these operators is identical to the number of multiplication operators; this number is equal to the product of the numbers of membership operators associated respectively with the various inputs, i.e. 25$\pi$ operators and 25 N operators in the example shown in FIGS. 7 and 8.

The fourth layer CO4 is constituted by 25 weighting operators $P_{i,j}$ ($P_{1,1}$ to $P_{5,1}$, ..., $P_{1,5}$ to $P_{5,5}$), for weighting the respective input vectors (such as $\vec{VR1}$ and $\vec{VR2}$) by the normalized products determined by the operators of the layer CO3, and the fifth layer CO5 is constituted by a single operator for summing the results delivered by the weighting operators $P_{i,j}$.

Since the outputs from the layers CO4 and CO5 are vectors having the same number of dimensions as the input vectors $\vec{VR1}$ and $\vec{VR2}$, the value Diag can be defined as the norm of the vector delivered by the summing circuit of the layer CO5.

The structure and the operation of the module 23 are similar to those of multilayer adaptive networks, also known as neuro-fuzzy networks, described in the document "ANFIS: Adaptative—network-based fuzzy inference system", Jyh-Shing Roger Jang, IEEE Transactions on Systems, Man and Cybernetics, Vol. 23, 1993, pp. 665-684.

In particular, the module 23 corresponding to FIGS. 7 and 8 is related to a fuzzy inference system having two inputs and one output, and having a rule base that has five rules of the Takagi-Sugeno type of the form:

if $\vec{VR1}$ is $A_i$ and $\vec{VR2}$ is $B_j$, then $\vec{DIAG}\ i,j = \alpha_{i,j}\vec{VR1} + \beta_{i,j}\vec{VR2} + \vec{\delta}_{i,j}$.

These rules are combined (weighted and summed) to obtain the vector $\vec{DIAG}$ whose norm (e.g. quadratic mean of its components) is the diagnosis value Diag that is compared with the reference value Valref.

More precisely, a parametric membership function μm(x) is associated respectively with each node (or operator) of the first layer CO1 with the membership function possibly being defined by the following equation:

$$\mu m(x) = \frac{1}{1 + \left(\frac{x - cm}{am}\right)^{2bm}}$$

having a graphical representation CC1-CC5 that is bell-shaped, as shown in FIG. 6.

As mentioned above, this function is applied to each component of a vector presented at the input, and the application of this function to a component produces the component having the same index in the corresponding output vector, referred to as the degree-of-membership vector.

Each of these membership functions is characterized by the particular values of three parameters $a_m$, $b_m$, and $c_m$, these three values being obtained by iterations during the preparatory stage.

In practice, it is possible for example to determine (by iterations) a value $a_0$ that is common to the five parameters $a_1$-$a_5$, and to determine (by iterations) a value $b_0$ that is common to the five parameters $b_1$-$b_5$, concerning the membership operators $A_1$ to $A_5$ connected to the input 27; the same can be done for the operators $B_1$ to $B_5$.

As can be seen in FIG. 6, the values of the parameters $c_1$-$c_5$ corresponding to the positions along the abscissa in the graph of the respective peaks of the bell-shaped curves CC1-CC5 that are characteristic of the respective membership functions μ1(x)-μ5(x) of the operators $A_1$ to $A_5$.

During the preparatory stage, the values for the parameters $a_m$, $b_m$, and $c_m$ of the membership functions can be determined iteratively by the gradient method, by back-propagation of errors; the iterative determination of the values for the three weighting coefficients $\alpha_{i,j}$, $\beta_{i,j}$, and $\vec{\delta}_{i,j}$ respectively characterizing each of the weighting operators $P_{i,j}$ can be performed by a direct method, in particular by the least squares method.

Unlike the operators $A_i$, $B_j$, and $P_{i,j}$, the operators π (layer CO2) and N (layer CO3) in the network of operators of the module 23 are not parameterized.

Each operator π outputs the "product" of the two vectors applied to its inputs, i.e. the product of a degree-of-membership vector coming from a first input vector multiplied by the transpose of a degree-of-membership vector coming from a second input vector, i.e.:

$W_{i,j} = \vec{VR1}_i \cdot \vec{VR2}_j^T$

This simple multiplier operator could be replaced by an operator of the t-norm or the t-conorm type, i.e. an operator that is bonded, monotonic, commutative, and associative.

Each normalization operator N of the layer CO3 outputs a normalized value $\overline{W_{i,j}}$ defined by:

$$\overline{W_{i,j}} = \frac{W_{i,j}}{\sum_{k,l} W_{k,l}}$$

These normalized values are used by the operators $P_{i,j}$ for weighting the inputs that output values $\vec{P}_{i,j}$ defined by the relationship:

$\vec{P}_{i,j} = \overline{W_{i,j}}(\alpha_{i,j}\vec{v1} + \beta_{i,j}\vec{v2} + \vec{\delta}_{i,j})$ where $\vec{v1}$ and $\vec{v2}$ are the two vectors (such as $\vec{VR1}$, $\vec{Vtest1}$, $\vec{VR2}$, $\vec{Vtest2}$) presented at the input of the module 23.

The vectors $\vec{P}_{i,j}$ output by the layer CO4 are added by the summing circuit of the layer CO5 that outputs a vector $\vec{DIAG}$, these vectors presenting the same number of dimensions as the input vectors.

The norm $\|\vec{DIAG}\|$ of the vector $\vec{DIAG}$ then constitutes the diagnosis value DIAG that is compared with the reference value.

Figure 11:
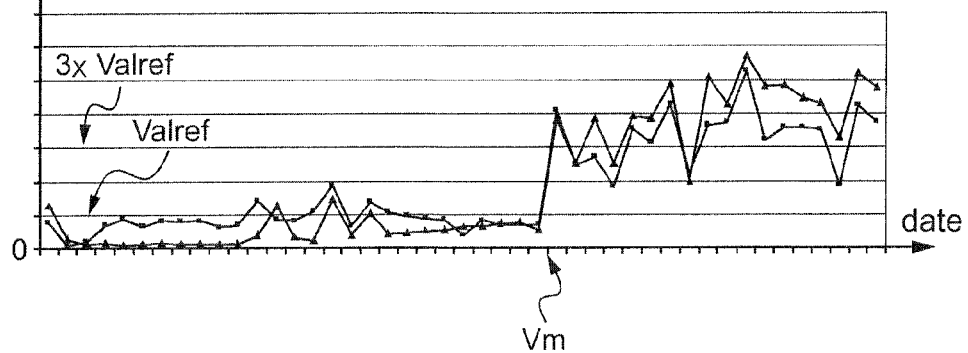
FIG. 11 is a graph showing diagrammatically the variations over time in the value of the diagnosis value calculated for a helicopter from spectra obtained from vibration measurements during successive flights.

The method of the invention has been applied to recorded measurement data after successive flights of a helicopter and has served to obtain respective diagnosis values DIAG as a result of those flights; the variation in the amplitude of this diagnosis value, shown by way of example in FIG. 11, has demonstrated that the reference value Valref serves to detect the first flight Vm after which a malfunction appeared in the mechanism of the main transmission gearbox of the helicopter.

What is claimed is:

1. A method of diagnosing an aircraft by analyzing at least one spectrum ($\vec{Vtest}$, $\vec{Vtest1}$, $\vec{Vtest2}$) obtained from measurements made on the aircraft, in particular from vibration measurements, the method comprising the following successive operations:
   synchronizing a plurality of measurement time data series;
   calculating a mean series of measurement time data from a plurality of synchronized measurement time data series;
   transforming from the time domain to the frequency domain in order to obtain the measurement frequency data vector from the mean series of time data;
   imputing the frequency data vector(s) corresponding to the spectrum (spectra) for analysis to a calculation module (23) together with at least one first reference spectrum data vector ($\vec{VR1}$, $\vec{VR2}$, $\vec{VR3}$, $\vec{VR4}$), the calculation module determining, for each input vector, a plurality of degree-of-membership vectors for the components of the input vector, specifying their respective degrees of membership to a plurality of classes, the calculation module determining a diagnosis value (Diag) as a function of the degree-of-membership vectors, and as a function of the spectrum (spectra) to be analyzed, of the reference spectrum (spectra), and of parameters ($a_m$, $b_m$, $c_m$, $\alpha_{i,j}$, $\beta_{i,j}$, $\delta_{i,j}$) determined from at least two reference spectra including said first reference spectrum.

2. A method according to claim 1, in which:

in a preparatory stage, at least two reference spectra are input to the parameterized calculation module (23) which outputs a diagnosis value, and then the parameters of the calculation module are modified by iterations in order to obtain a reference value (Valref) at the output; and then in a diagnosis stage, one or more spectra can be analyzed together with some of the reference spectra are input to the parameterized calculation module which outputs the diagnosis value, and a fault is diagnosed when said diagnosis value exceeds the reference value.

3. A method according to claim 1, in which a calculation module is used having a plurality of operators structured in layers and in a network, including parametric membership operators ($A_i$, $B_j$), and parametric weighting operators ($P_{i,j}$) applied to the spectra presented at its inputs.

4. A method according to claim 1, in which, in the diagnosis stage, at least one spectrum data, or frequency data vector for diagnosis is applied together with at least one reference spectrum data vector to the inputs of the calculation module which determines, for each input vector, a plurality of degree-of-membership vectors for the components of the input vector, specifying their respective degrees of membership to a plurality of classes, and calculates a (single) diagnosis value as a function of the degree-of-membership vectors, and in which a fault of the aircraft is indicated when the diagnosis value exceeds a threshold or reference value.

5. A program comprising code applied to a medium, such as a memory, or embodied as a signal, the code being readable and/or executable by at least one data processor unit, to diagnose the (good or bad) operation of an aircraft, the code having code segments for performing the operations of a method according to claim 1.

6. A system for diagnosing an aircraft, the system comprising:

a read member for reading a data medium and arranged to read data relating to measurements made on the aircraft;

a database containing reference spectrum data for the aircraft;

transformation apparatus for transforming the measurement data from the time domain to the frequency domain, which apparatus is connected to the read member to receive the measurement data and to output spectrum data to be analyzed; and a calculation member connected to the database and to the transformation apparatus, and programmed to perform the operations of a method according to claim 1.

7. A method according to claim 1, in which the calculation module (23) has a layer structure including a layer (CO1) of membership operators, and in which a vector is applied to the input of the membership operators of the module (23) in order to obtain at the output of each membership operator a degree-of-membership vector that presents the same number of dimensions as the input vector.

8. A method according to claim 1, in which each of the spectrum data vectors is the result of applying a Fourier transform to measurement data obtained by sampling signals delivered by microphones or accelerometers at a frequency of not less than about 1 kHz (in particular a frequency of about 5 kHz, 10 kHz, 50 kHz, or 250 kHz).

9. A method according to claim 1, in which each of the spectrum data vectors comprises about one to several thousand components.

10. A method according to claim 9, in which the calculation module (23) includes a layer (CO2) of multiplication operators (□), and in which each pair of degree-of-membership vectors is applied to the inputs of the multiplication operators of the module (23) in order to obtain at the output from each multiplication operator a value for the product of the corresponding pair of vectors, said product representing the degree of activation of a rule associated with the pair of membership classes corresponding to the pair of vectors.

11. A method according to claim 10, in which the calculation module (23) includes a layer (CO3) of normalization operators (N), and in which each input vector product value is applied to the input of the normalization operators of the module (23) in order to obtain at the output from each normalization operator a normalized value for the product of the corresponding pair of vectors.

12. A method according to claim 11, in which the calculation module (23) includes a layer (CO4) of weighting operators ($P_{i,j}$) for the input vectors, and in which the normalized vector product values and the input vector are applied as inputs to the weighting operators to obtain at the output from each weighting operator a weighted vector.

13. A method according to claim 12, in which the calculation module (23) includes a layer (CO5) comprising a summing operator (□) for summing the weighted vectors, and in which each weighted vector is input to the summing operator to obtain at the output from the summing operator a overall vector, and the diagnosis value is calculated as a function of (is equal to) the norm of the overall vector.

14. A method according to claim 9, in which the membership operators of the first layer (CO1) present continuous and differentiable membership curves (CC1-CC5) that are generally bell-shaped or Gaussian.

* * * * *